United States Patent
Mitchell et al.

(10) Patent No.: US 7,826,455 B2
(45) Date of Patent: Nov. 2, 2010

(54) PROVIDING SINGLE POINT-OF-PRESENCE ACROSS MULTIPLE PROCESSORS

(75) Inventors: Nathan A. Mitchell, Siler City, NC (US); Mark Albert, Cary, NC (US); Chris O'Rourke, Apex, NC (US); Robert A. Mackie, Cary, NC (US); Michael S. Sutton, Garner, NC (US)

(73) Assignee: Cisco Technology, Inc., San Jose, CA (US)

( * ) Notice: Subject to any disclaimer, the term of this patent is extended or adjusted under 35 U.S.C. 154(b) by 229 days.

(21) Appl. No.: 11/934,184

(22) Filed: Nov. 2, 2007

(65) Prior Publication Data

US 2009/0116383 A1    May 7, 2009

(51) Int. Cl.
*H04L 12/28* (2006.01)
(52) U.S. Cl. .................. 370/392; 370/395.32
(58) Field of Classification Search .......... None
See application file for complete search history.

(56) References Cited

U.S. PATENT DOCUMENTS

| | | | | |
|---|---|---|---|---|
| 4,827,499 A * | 5/1989 | Warty et al. | ................ | 455/560 |
| 5,191,651 A * | 3/1993 | Halim et al. | ................ | 709/250 |
| 5,668,653 A * | 9/1997 | Garcia | ................ | 398/53 |
| 5,884,018 A * | 3/1999 | Jardine et al. | ................ | 714/4 |
| 5,920,705 A | 7/1999 | Lyon et al. | ................ | 395/200.7 |
| 5,966,085 A * | 10/1999 | Van Dyke-Lewis et al. | ... | 341/95 |
| 6,049,893 A | 4/2000 | Liddell et al. | ................ | 714/23 |
| 6,170,068 B1 | 1/2001 | Liddell et al. | ................ | 714/49 |
| 6,272,136 B1 * | 8/2001 | Lin et al. | ................ | 370/392 |
| 6,370,583 B1 * | 4/2002 | Fishler et al. | ................ | 709/238 |
| 6,631,422 B1 * | 10/2003 | Althaus et al. | ................ | 709/250 |
| 6,631,447 B1 * | 10/2003 | Morioka et al. | ................ | 711/141 |
| 6,717,943 B1 * | 4/2004 | Schwering | ................ | 370/389 |
| 6,842,443 B2 * | 1/2005 | Allen et al. | ................ | 370/335 |
| 7,050,394 B2 * | 5/2006 | Johnson et al. | ................ | 370/230.1 |
| 7,203,192 B2 * | 4/2007 | Desai et al. | ................ | 370/389 |
| 7,274,706 B1 * | 9/2007 | Nguyen et al. | ................ | 370/419 |
| 7,286,526 B2 * | 10/2007 | Basso et al. | ................ | 370/360 |
| 7,313,614 B2 * | 12/2007 | Considine et al. | ................ | 709/223 |
| 7,508,764 B2 * | 3/2009 | Back et al. | ................ | 370/235 |
| 7,529,242 B1 * | 5/2009 | Lyle | ................ | 370/392 |
| 7,580,716 B2 * | 8/2009 | Ransom et al. | ................ | 455/453 |
| 2002/0107962 A1 * | 8/2002 | Richter et al. | ................ | 709/225 |
| 2002/0165947 A1 * | 11/2002 | Akerman et al. | ................ | 709/223 |
| 2002/0174227 A1 * | 11/2002 | Hartsell et al. | ................ | 709/226 |
| 2003/0009625 A1 * | 1/2003 | Gruner et al. | ................ | 711/119 |
| 2003/0120876 A1 * | 6/2003 | Hass et al. | ................ | 711/146 |
| 2003/0217177 A1 * | 11/2003 | Gulati | ................ | 709/238 |
| 2003/0221015 A1 * | 11/2003 | Basso et al. | ................ | 709/234 |
| 2003/0235194 A1 * | 12/2003 | Morrison | ................ | 370/389 |
| 2004/0133634 A1 * | 7/2004 | Luke et al. | ................ | 709/203 |

(Continued)

*Primary Examiner*—Ayaz R Sheikh
*Assistant Examiner*—Faiyazkhan Ghafoerkhan
(74) *Attorney, Agent, or Firm*—Baker Botts L.L.P.

(57) ABSTRACT

A method for providing single point-of-presence for a network element includes receiving a packet at a network processor, determining if the packet is to be directed to a particular one of a plurality of traffic processors if a source address of the packet is associated with a subscriber terminal, and determining if the packet is to be directed to the particular one of the plurality of traffic processors if a destination address of the packet is associated with the subscriber terminal. The method further includes distributing the packet to the particular one of the plurality of traffic processors.

17 Claims, 3 Drawing Sheets

U.S. PATENT DOCUMENTS

| | | |
|---|---|---|
| 2004/0260800 A1 | 12/2004 | Gu et al. .................... 709/223 |
| 2005/0108397 A1* | 5/2005 | Basso et al. ................ 709/225 |
| 2006/0072480 A1 | 4/2006 | Deval et al. ................ 370/254 |
| 2006/0114903 A1* | 6/2006 | Duffy et al. ................ 370/390 |
| 2006/0221821 A1* | 10/2006 | Martinez Ransom et al. ..... 370/229 |
| 2006/0282648 A1* | 12/2006 | Deneroff et al. .............. 712/11 |
| 2006/0291434 A1 | 12/2006 | Gu et al. .................... 370/338 |
| 2007/0165547 A1* | 7/2007 | Lindwer et al. ............. 370/256 |
| 2007/0180513 A1* | 8/2007 | Raz et al. ..................... 726/12 |
| 2010/0003999 A1* | 1/2010 | Park et al. ................ 455/452.2 |

* cited by examiner

PROVIDING SINGLE POINT-OF-PRESENCE ACROSS MULTIPLE PROCESSORS

TECHNICAL FIELD

This invention relates in general to communications, and, more particularly, to providing single point-of-presence across multiple processors.

BACKGROUND

Processor systems have grown in complexity and sophistication in recent years. Network operators are seeking next-generation solutions that have increased performance, such as increased features and speed, as well as improved manageability and reduced complexity. Increases in performance in single processor systems can be achieved without complicating management and complexity by upgrading systems to run faster processors as they become available. While symmetric multiprocessing (SMP) processors can add more computing power in the way of instructions executed per-second, these processors can still be bottlenecked by a single network input/output (IO) interface or by cache-contention when running advanced networking applications.

In many networking applications, relying solely on Moore's law for processor improvements has not kept pace with performance requirements. For these applications, additional scalability is often achieved by introducing loadbalancers that distribute load across multiple systems. A challenge with the multiple system approach is that each system needs its own network layer addressing (Layer 2 and Layer 3), and each system must be managed independently such as for configuration and monitoring functions.

BRIEF DESCRIPTION OF THE DRAWINGS

For a more complete understanding of the present invention and its advantages, reference is now made to the following description, taken in conjunction with the accompanying drawings, in which.

OVERVIEW

Figure 1:
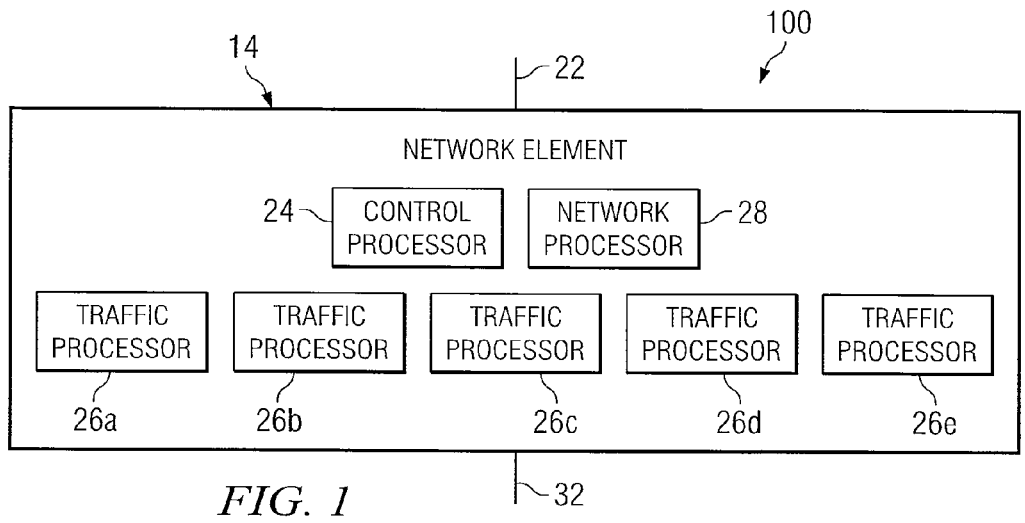
FIG. 1 is a general, simplified block diagram of a network element for providing single point-of-presence across multiple processors in accordance with one embodiment of the present invention.

In accordance with one embodiment, a method for providing single point-of-presence for a network element includes receiving a packet at a network processor, determining if the packet is to be directed to a particular one of a plurality of traffic processors if a source address of the packet is associated with a subscriber terminal, and determining if the packet is to be directed to the particular one of the plurality of traffic processors if a destination address of the packet is associated with the subscriber terminal. The method further includes distributing the packet to the particular one of the plurality of traffic processors.

In accordance with another embodiment, a network element includes a plurality of traffic processors, and a network processor. The network processor is operable to receive a packet, determine if the packet is to be directed to a particular one of the plurality of traffic processors if a source address of the packet is associated with a subscriber terminal, and determine if the packet is to be directed to the particular one of the plurality of traffic processors if a destination address of the packet is associated with the subscriber terminal. The network processor is further operable to distribute the packet to the particular one of the plurality of traffic processors.

In accordance with still another embodiment, logic embodied in computer-readable storage media for providing single point-of-presence for a network element is provided. When executed by a computer the logic is operable to receive a packet at a network processor, determine if the packet is to be directed to a particular one of a plurality of traffic processors if a source address of the packet is associated with a subscriber terminal, and determine if the packet is to be directed to the particular one of the plurality of traffic processors if a destination address of the packet is associated with the subscriber terminal. The logic is further operable to distribute the packet to the particular one of the plurality of traffic processors.

A technical advantage of certain embodiments includes the ability to scale across multiple processors while maintaining the look and feel of a single processor from an adjacent network perspective.

Another technical advantage of certain embodiments include allowing a customer to deploy a system that has the aggregate computing power of an entire array of processors without having to consume network addresses or manage configurations on each of the multiple processors individually. The entire array of processors can be represented to adjacent networks with a single MAC address (Layer 2 address) and single IP address (Layer 3 address). This results in reduced consumption of network resources, such as IP addresses, and a reduced management burden from an operator's perspective.

DESCRIPTION OF EXAMPLE EMBODIMENTS

Embodiments of the present invention provide an approach to improving scalability across many standalone processors without consuming additional Layer 2 and Layer 3 network addresses or increasing the management requirements for a system. Embodiments of the present invention provide a network element that divides an application load among traffic processors, and maintains a single Layer 2 and Layer 3 network presence on a control processor by utilizing a network processor to filter traffic to the control processor and loadbalancing the remaining traffic among the array of traffic processors. This allows a multiprocessor system to present a single IP/MAC address to adjacent networks, and for network element applications to scale without the burden of increased addressing or management interfaces.

FIG. 1 is a simplified block diagram of a system 100 for providing a single point-of-presence (POP) across multiple processors in accordance with one example embodiment of the present invention. System 100 includes a network element 14. The network element 14 includes a network interface 22 that provides an interface between the network element 14 and one or more communication networks to which the network element 14 is connected. The network element 14 further includes a control processor 24, a network processor 28, and an array of traffic processors 26a-26e. In various embodiments, the network processor 28 receives an ingress packet from the network element 14 and distributes the ingress packet to either the control processor 24 or a selected one of the traffic processors 26a-26e. In various embodiments, packets sent from the network element 14 are not required to pass through the network processor 28 or the control processor 24.

The control processor 24 maintains the presence of the network element 14 from a network layer (Layer 3) perspective such that a single IP address is associated with the network element 14. In various embodiments, the control processor 24 can further present a single management interface to a user by handling inbound management sessions and data layer (Layer 2)/network layer (Layer 3) presence traffic as well as control plane traffic. The control processor 24 can further function to inform the network processor 28 of the system's local addresses, as well as inform the network processor 28 of criteria for load balancing transit and application traffic to the traffic processors 226a-26e. In accordance with various embodiments, the control processor 24 functions to handle incoming Address Resolution Protocol (ARP) messages and issue outgoing messages. In various embodiments, the control processor 24 functions to handle non-subscriber related traffic such as answering Address Resolution Protocol (ARP) requests, issuing ARP requests, handling multicast broadcasts, as well as handling other non-subscriber data layer (Layer 2) and network layer (Layer 3) activity from a representing IP address perspective.

The traffic processors 26a-26e handle network traffic, such as subscriber traffic, that is transmitted through the network element 14. The traffic through the traffic processors 26a-26e is distributed among the traffic processors 26a-26e by the network processor 28. In some embodiments, the network processor 28 is an Internet Exchange Processor (IXP). The network processor 28 may still further function to filter traffic destined to local addresses and broadcast message to the control processor 24 in some embodiments. In various embodiments, the network processor 28 further functions to forward non-subscriber traffic to the control processor 24.

In accordance with some embodiments, the network processor 28 performs load balancing of subscriber traffic to a specific traffic processors 26a-26e in accordance with a source address associated with a subscriber terminal for packets received from the subscriber terminal, and a destination address associated with the subscriber terminal for packets destined for the subscriber. Accordingly, subscriber traffic, both to and from a particular subscriber terminal, are handled by the same traffic processor 26a-26e. In accordance with some embodiments, a hash of either the source IP address for packets received from a subscriber terminal or the destination IP address of packets addressed to a subscriber terminal is performed to insure that the traffic, both to and from the particular subscriber terminal, is handled by the same traffic processor 26a-26e.

In at least one embodiment, the network processor 28 distributes subscriber traffic across the traffic processors 26a-26e by hashing the subscriber IP address to form an index into a packet distribution table of the traffic processors 26a-26e. In various embodiments, the packet distribution table is configured by the control processor 24. In accordance with various embodiments, the network processor maintains a database of subscriber virtual LANs (VLANs). If a particular packet received by the network element 14 is from a subscriber VLAN, the source IP address of the packet is hashed. If the particular packet received by the network element 14 is not from a subscriber VLAN, the destination IP address of the packet is hashed.

Although the network element 14 is described as having one control processor 24, one network processor 28, and five traffic processors 26a-26e, it should be understood that the principles described herein can be applied to network elements having any number of the above-identified processors. In various embodiments, each of the control processor 24, the network processor 28, and the traffic processors 26a-26e is an independent processor that execute instructions in parallel with its own scheduler and own memory.

Software and/or hardware may reside in network element 14 in order to achieve the teachings of the features of the present invention. Note that, due to their flexibility, these components may alternatively be equipped with (or include) any suitable component, device, application specific integrated circuit (ASIC), processor, microprocessor, algorithm, read-only memory (ROM) element, random access memory (RAM) element, erasable programmable ROM (EPROM), electrically erasable programmable ROM (EEPROM), field-programmable gate array (FPGA), or any other suitable element or object that is operable to facilitate the operations thereof. Considerable flexibility is provided by the structure of network element 14 in the context of system 100 and, accordingly, they should be construed as such.

It should be noted that the internal structure of the system of FIG. 1 is versatile and can be readily changed, modified, rearranged, or reconfigured in order to achieve its intended operations or additional operations. Additionally, any of the items within FIG. 1 may be combined, where appropriate, or replaced with other functional elements that are operable to achieve any of the operations described herein.

A component of system 100 may include any suitable arrangement of elements, for example, an interface, logic, memory, other suitable element, or a combination of any of the preceding. An interface receives input, sends output, processes the input and/or output, performs other suitable operation, or performs a combination of any of the preceding. An interface may comprise hardware and/or software.

Logic performs the operations of the component, for example, executes instructions to generate output from input. Logic may include hardware, software, other logic, or a combination of any of the preceding. Certain logic, such as a processor, may manage the operation of a component. Examples of a processor include one or more computers, one or more microprocessors, one or more applications, other logic, or a combination of any of the preceding.

A memory stores information. A memory may comprise computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), other computer-readable medium, or a combination of any of the preceding.

Figure 2:
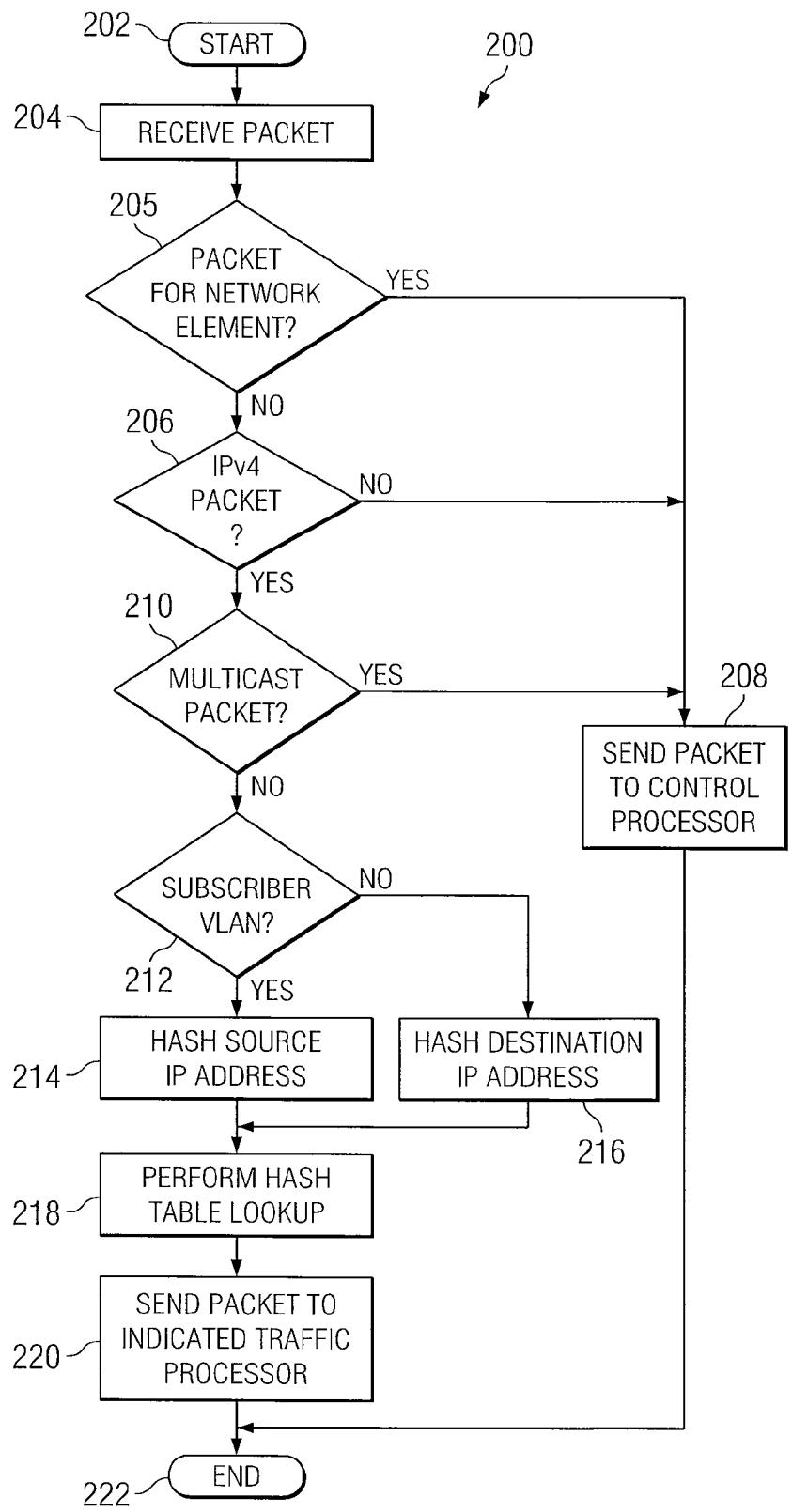
FIG. 2 is a simplified procedure illustrating distributing network traffic in accordance with one embodiment of the present invention.

FIG. 2 is an example flow diagram of a procedure 200 for distributing network traffic in accordance with one embodiment. The procedure 200 starts in a step 202. In a step 204, a packet is received by the network processor 28 in the network element 14. In a step 205, the network processor 28 determines if the destination address of the packet is associated with the network element 14. Examples of packets having a destination address associated with the network element 14 include non-subscriber traffic such as Remote Authentication Dial In User Service (RADIUS), GPRS Tunneling Protocol (GTP), high availability (HA), and ARPs. If the destination address of the packet is associated with the network element 14, the packet is sent to the control processor 24 in a step 208, and the procedure ends in a step 222. If the destination of the packet is not the network element 14, the procedure continues to a step 206. In step 206, the network processor 28 determines if the packet is an IPv4 packet. If the packet is not an IPv4 packet, the packet is sent to the control processor 24 in step 208, and the procedure ends in step 222. If it is determined in step 206 that the packet is an IPv4 packet, the network processor 28 determines if the packet is a multicast packet in a step 210. If it is determined that the packet is a multicast packet, the procedure continues to step 208 in which the packet is sent to the control processor 24, and the procedure 200 ends in step 222.

If it is determined in step 210 that the packet is not a multicast packet, the procedure 200 continues to step 212 in which the network processor 28 determines if the packet is from a subscriber VLAN. If it is determined in step 212 that the packet is not from a subscriber VLAN, the destination IP address of the packet is hashed in a step 216 to generate a hash value, and the procedure continues to a step 218. If it is determined in step 212 that the packet is from a subscriber VLAN, the source IP address of the packet is hashed in a step 214 to generate a hash value, and the procedure continues to step 218.

In step 218, a table lookup of the hash value from either step 214 or step 216 is performed. The table lookup matches the hash value to a particular traffic processor 26a-26e. In a step 220, the network processor 28 sends the packet to the particular traffic processor indicated by the table lookup. In step 222, the procedure 200 ends.

Some of the steps discussed with reference to FIG. 2 may be changed or deleted where appropriate and additional steps may also be added to these process flows. These changes may be based on specific communication architectures or particular interfacing arrangements and configurations of associated elements and do not depart from the scope or the teachings of the present invention.

Figure 3:
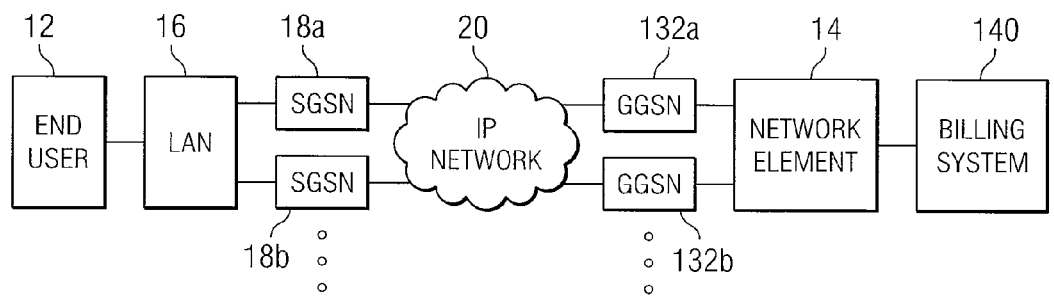
FIG. 3 is a simplified block diagram of an embodiment of a communication system including the network element of FIG. 1.

FIG. 3 is a simplified block diagram of an embodiment of a communication system 300 including the system 100 of FIG. 1. Communication system 300 includes end user 12, network element 14, a billing system element 140, a radio access network (RAN) 16, multiple serving general packet radio service (GPRS) support nodes (SGSN) 18a and 18b, and an interne protocol (IP) network 20. Additionally, communication system 300 includes multiple gateway GPRS support nodes (GGSNs) 132a b. In the embodiment illustrated in FIG. 3, network element 14 operates as a client services gateway (CSG). Network element 14 operates to facilitate communications between GGSNs 132 and billing system element 140.

Communication system 300 may be generally configured or arranged to represent a 2.5 G communication architecture applicable to a Global System for Mobile (GSM) environment in accordance with a particular embodiment. Communication system 300 may also be configured to reflect a version of any suitable GPRS tunneling protocol. Communication system 300 may additionally cooperate with first generation, 2 G, and 3 G architectures that provide some configuration for allocating data to an end user in a network environment. Communication system 300 may also be employed in any other suitable communication architecture that seeks to allocate or otherwise manage data or information in a network environment. In another example, communications system 300 may cooperate with the Point-to-Point Protocol (PPP).

In accordance with an embodiment, communication system 300 operates to accurately manage user access. System 300 may parse IP packets transmitted between a user (client) and a server (or any other suitable destination). For selected flows and for selected clients, billing system element 140 debits a user account based on the type and quantity of information being transmitted. In a general sense, network element 14 may cooperate with billing system element 140 in order to charge an end user of the end user 12 based on a particular event, content, or communication flow. Network element 14 may query one or more of the elements included within billing system element 140 in order to effectively and accurately distribute information to end user 12.

The user of the end user terminal 12 is a subscriber, client, customer, entity, source, or object seeking to initiate network communication in communication system 300 via IP network 20. End user terminal 12 may be inclusive of devices used to initiate a communication, such as a computer, a personal digital assistant (PDA), a laptop or an electronic notebook, a telephone, a mobile station, or any other device, component, element, or object capable of initiating voice or data exchanges within communication system 300. End user terminal 12 may also be inclusive of a suitable interface to the human user, such as a microphone, a display, a keyboard, or other terminal equipment (such as for example an interface to a personal computer or to a facsimile machine in cases where end user 12 is used as a modem). End user terminal 12 may also be any device that seeks to initiate a communication on behalf of another entity or element, such as a program, a database, or any other component, device, element, or object capable of initiating a voice or a data exchange within communication system 300. Data, as used herein in this document, refers to any type of packet, numeric, voice, video, graphic, or script data, or any type of source or object code, or any other suitable information in any appropriate format that may be communicated from one point to another.

RAN 16 is a communications interface between end user terminal 12 and SGSNs 18a and 18b. RAN 16 may comprise a base transceiver station and a base station controller in one embodiment. The communications interface provided by RAN 16 may allow data to be exchanged between end user terminal 12 and any number of selected elements within communication system 300. RAN 16 may facilitate the delivery of a request packet generated by end user terminal 12 and the reception of information sought by end user terminal 12. RAN 16 is only one example of a communications interface between end user 12 and SGSNs 18a and 18b. Other suitable types of communications interfaces may be used for any appropriate network design and be based on specific communications architectures in accordance with particular needs.

SGSNs 18a and 18b and GGSNs 132a and 132b are communication nodes or elements that cooperate in order to facilitate a communication session involving end user terminal 12. GGSNs 132a-b are communications nodes operating in a GPRS environment that may be working in conjunction with multiple SGSNs 18a and 18b to provide a communications medium in a GPRS service network. GGSNs 132a and 132b may be inclusive of a walled garden (providing a security or access functionality to communication system 300) or any other suitable mechanism that a network operator may choose to implement in providing some connectivity for a network. GPRS represents a packet-based data bearer service for communication services that may be delivered as a network overlay for any type of suitable network configuration or platform. GPRS may support multiple internet communication protocols and may enable existing IP, point-to-point protocol (PPP), or any other suitable applications or platforms to operate over a given network.

When end user terminal 12 changes between SGSN 18a and 18b, the change may be communicated to network element 14 by any appropriate node such as a selected GGSN 132a or 132b. This could be effectuated by a remote access dial-in user service (RADIUS) accounting message via a start signal or an interim update signal. This could also be reflected in a vendor-specific attribute that indicates the new SGSN being different from the current SGSN being used by end user terminal 12. That message may also be communicated to billing system element 140 indicating the change in SGSN. The change in SGSN may result in quota data being returned to billing system element 140 for this particular data such as, for example, prepaid content. Pricing may vary for prepaid content depending on the geographic position of end user terminal 12, roaming off network, or which SGSN is currently being implemented. Additionally, for example, pricing may also be different based on a given fee structure such as pricing per download, pricing per byte, or pricing for a selected time interval. Alternatively, any other parameter may be used in order to vary billing rates provided for a given end user 12. A selected GGSN 132a or 132b may report the change in SGSN by end user terminal 12 via RADIUS messaging. Alternatively, this signaling may be provided by any data exchange or architected in any suitable communication standard or protocol in accordance with particular needs.

IP network 20 represents a series of points or nodes of interconnected communication paths for receiving and transmitting packets of information that propagate through communication system 300. IP network 20 offers a communicative interface between end user 12 and selected GGSNs 132a-b and may be any local area network (LAN), wireless local area network (WLAN), metropolitan area network (MAN), wide area network (WAN), virtual private network (VPN), or any other appropriate architecture or system that facilitates communications in a network environment. IP network 20 may implement a user datagram protocol (UDP)/internet protocol (UDP/IP) connection and use a transmission control protocol (TCP/IP) communication language protocol in particular embodiments. However, IP network 20 may alternatively implement any other suitable communication protocol for transmitting and receiving data packets within communication system 300.

Network element 14 may be inserted into a data flow that may view, extract, identify, access, or otherwise monitor information included within the data flow. Network element 14 may handle the enforcement of access, quota distribution, and accounting that is provided by the information retrieved from elements included within billing system element 140. Network element 14 may generally deduct quota after it has been properly allocated and, subsequently, retrieve additional quota when that quota allocation has been consumed. In a general sense, network element 14 may be responsible for quota enforcement for end user terminal 12. Network element 14 may include any suitable software, hardware, components, modules, devices, elements, or objects to facilitate the operations thereof.

In at least one embodiment, the network element 14 is represented to the rest of the communication system 300 by a single IP address. In this embodiment, a particular traffic processor 26a is designated by the network processor 28 to handle the traffic transiting through the network element 14 to and from the end user terminal 12, in the same or similar manner as the embodiments described with respect to FIGS. 1-2.

Figure 4:
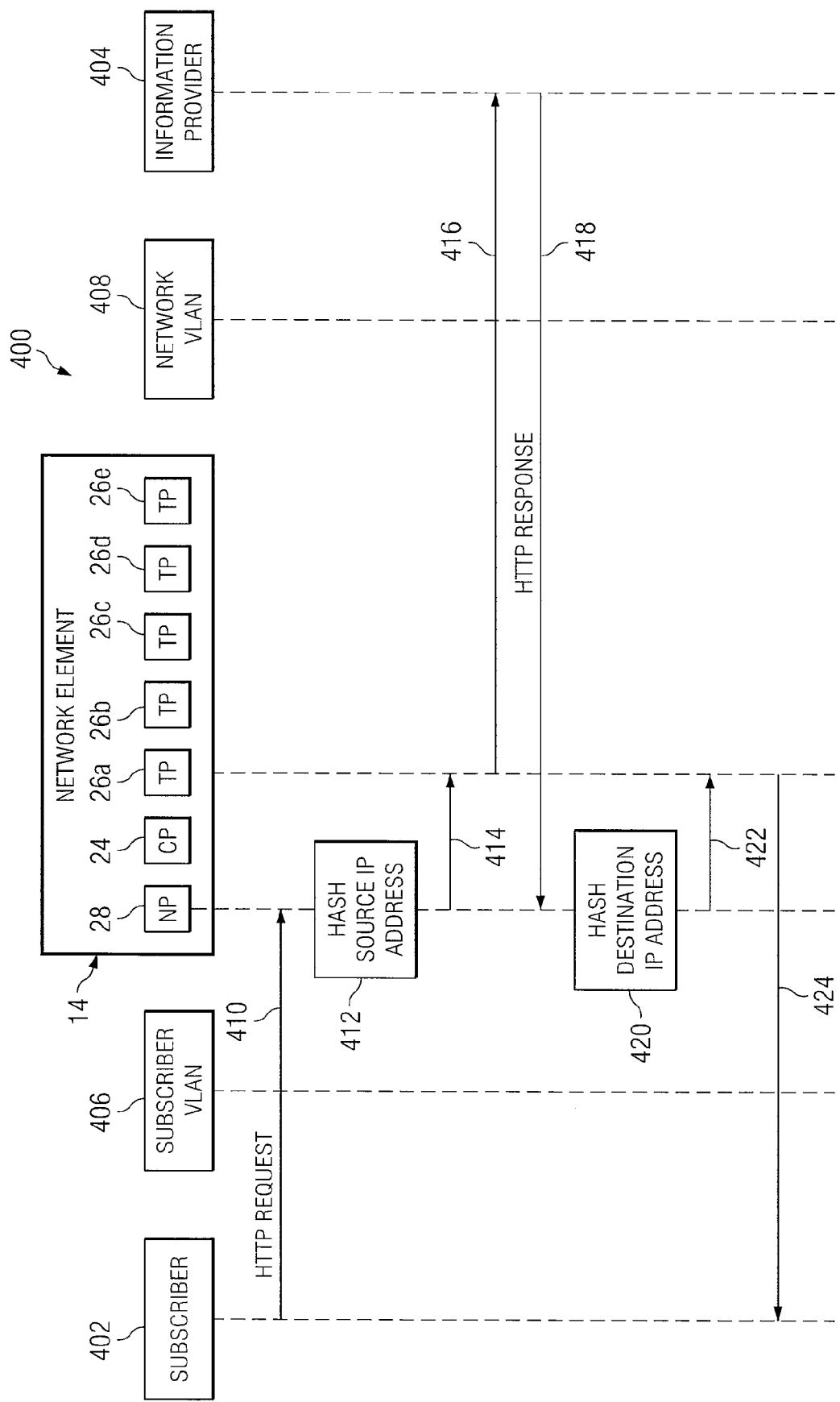
FIG. 4 is a simplified signaling diagram in accordance with one embodiment of the present invention.

FIG. 4 is a simplified signaling diagram 400 in accordance with one embodiment of the present invention. In FIG. 4, a subscriber terminal 402 is connected via a subscriber VLAN 406 to the network element 14, and an information provider 404 is connected to the network element 14 via a network VLAN 408. The network element 14 includes a network processor 28, a control processor 24, and a plurality of traffic processors 26a-26e.

Subscriber terminal 402 may be inclusive of devices used to initiate a communication, such as a computer, a personal digital assistant (PDA), a laptop or an electronic notebook, a telephone, a mobile station, or any other device, component, element, or object capable of initiating voice or data exchanges within a communication system. Subscriber terminal 402 may also be inclusive of a suitable interface to the human user, such as a microphone, a display, a keyboard, or other terminal equipment (such as for example an interface to a personal computer or to a facsimile machine in cases where subscriber terminal 402 is used as a modem). Subscriber terminal 402 may also be any device that seeks to initiate a communication on behalf of another entity or element, such as a program, a database, or any other component, device, element, or object capable of initiating a voice or a data exchange within a communication system. Data, as used herein in this document, refers to any type of packet, numeric, voice, video, graphic, or script data, or any type of source or object code, or any other suitable information in any appropriate format that may be communicated from one point to another.

In a step 410, the subscriber terminal 402 sends an HTTP request having a source address associated with the subscriber terminal 402 and a destination address associated with the information provider 404. The HTTP request is received by the network processor 28 of the network element 14.

In a step 412, the network processor 28 determines that the HTTP request was received from the subscriber VLAN 406 performs a hashing operation on the source IP address, and determines that the HTTP request should be directed to traffic processor 26a based on the results of the hashing operation. In various embodiments, step 412 is not performed until at least one of steps 205, 206, 208, 210, and 212 described in FIG. 2 are performed. In a step 414, the network processor 28 directs the HTTP request to traffic processor 26a. In a step 416, the HTTP request is forwarded from the traffic processor 26a to the information provider 404.

In response to receiving the HTTP request, the information provider 404 sends an HTTP response having a source address associated with the information provider 404 and a destination address associated with the subscriber terminal 402 in a step 418. The HTTP response is received by the network processor 28 of the network element 14. In a step 420, the network processor 28 determines that HTTP response was not received from a subscriber VLAN, performs a hashing operation on the destination IP address, and determines that the HTTP response should be directed to traffic processor 26a based on the results of the hashing operation. In various embodiments, step 420 is not performed until at least one of steps 205, 206, 208, 210, and 212 described in FIG. 2 are performed. In a step 422, the HTTP response is directed to the traffic processor 26a. In a step 424, the traffic processor 26a forwards the HTTP response to the subscriber terminal 402.

By routing traffic from the subscriber terminal 402 to the information provider 404 through a particular traffic processor 26a-26e based on the source IP address associated with the subscriber terminal 402, and routing traffic from the information provider 404 to the subscriber terminal 402 based on the destination IP address associated with the subscriber terminal 402, the same traffic processor 26a-26e will be used to route traffic through the network element 14 both to and from the subscriber terminal 402.

Some of the steps discussed with reference to FIG. 4 may be changed or deleted where appropriate and additional steps may also be added to these process flows. These changes may be based on specific communication architectures or particular interfacing arrangements and configurations of associated elements and do not depart from the scope or the teachings of the present invention.

Additionally, although described in specific environments and contexts, the present invention could be used in countless applications. Numerous other changes, substitutions, variations, alterations, and modifications may be ascertained by those skilled in the art and it is intended that the present invention encompass all such changes, substitutions, variations, alterations, and modifications as falling within the spirit and scope of the appended claims. Moreover, the present invention is not intended to be limited in any way by any statement in the specification that is not otherwise reflected in the appended claims.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

System 100 may be extended to any scenario in which it is desirable to present a single network address to adjacent networks in a multiprocessor system. This may also be extended to any other network signaling protocols to achieve the teachings of the present invention. Moreover, significant flexibility is provided by system 100 in that any suitable one or more components may be replaced with other components that facilitate their operations.

What is claimed is:

1. A method, comprising:
    receiving a packet at a network processor of a network element;
    determining if the packet is to be directed to a control processor configured to allow a single IP address to be associated with the network element, or to one of a plurality of traffic processors configured to handle network traffic;
    upon determining that the packet is to be directed to the control processor, distributing the packet to the control processor; and
    upon determining that the packet is to be directed to one the plurality of traffic processors:
        determining whether the packet was received from a subscriber network or a different network that is not a subscriber network;
        performing a hashing operation on the source address if the packet was received from the subscriber network and performing the hashing operation on the destination address if the packet was received from the different network, the hashing operation producing a hash value;
        determining if the packet is to be directed to a particular one of the plurality of traffic processors based on the hash value; and
        distributing the packet to the particular one of the plurality of traffic processors.

2. The method of claim 1, further comprising:
    distributing the packet to a control processor if the packet is not associated with the subscriber terminal or if the destination address is associated with the network element.

3. The method of claim 1, wherein the packet comprises a request from the subscriber terminal to an information provider, the packet having a source address associated with the subscriber terminal.

4. The method of claim 1, wherein the packet comprises a response from an information provider to a subscriber terminal, the packet having a destination address associated with the subscriber terminal.

5. The method of claim 1, further comprising:
    forwarding the packet from the particular one of the plurality of traffic processors to the subscriber terminal.

6. The method of claim 1, further comprising:
    forwarding the packet from the particular one of the plurality of traffic processors to an information provider.

7. The method of claim 1, wherein the network element presents a single network layer address to adjacent networks.

8. The method of claim 1, wherein at least a portion of incoming traffic is loadbalanced amongst the plurality of traffic processors.

9. The method of claim 1, wherein determining whether the packet was received from a subscriber network or a different network that is not a subscriber network comprises determining whether the packet was received from a subscriber virtual local area network or a different network that is not a subscriber virtual local area network.

10. A network element, comprising:
    a control processor configured to allow a single IP address to be associated with the network element;
    a plurality of traffic processors configured to handle network traffic; and
    a network processor operable to:
        receive a packet;
        determine if the packet is to be directed to the control processor, or to one of the plurality of traffic processors;
        upon determining that the packet is to be directed to the control processor, distributing the packet to the control processor; and
        upon determining that the packet is to be directed to one the plurality of traffic processors:
            determine whether the packet was received from a subscriber network or a different network that is not a subscriber network;
            perform a hashing operation on the source address if the packet was received from the subscriber network and perform the hashing operation on the destination address if the packet was received from the different network, the hashing operation producing a hash value:
            determine if the packet is to be directed to a particular one of the plurality of traffic processors based on the hash value; and
            distribute the packet to the particular one of the plurality of traffic processors.

11. The network element of claim 10,
    wherein the network processor is further operable to distribute the packet to the control processor if the packet is not associated with the subscriber terminal or if the destination address is associated with the network element.

12. The network element of claim 10, wherein the network processor operable to determine whether the packet was received from a subscriber network or a different network that is not a subscriber network is further operable to determine whether the packet was received from a subscriber virtual local area network or a different network that is not a subscriber virtual local area network.

13. Logic providing single point-of-presence for a network element, the logic encoded in one or more tangible media for execution and when executed operable to:

receive a packet at a network processor of a network element;
determine if the packet is to be directed to a control processor configured to allow a single IP address to be associated with the network element, or to one of a plurality of traffic processors configured to handle network traffic;
upon determining that the packet is to be directed to the control processor, distributing the packet to the control processor; and
upon determining that the packet is to be directed to one the plurality of traffic processors:
  determine whether the packet was received from a subscriber network or a different network that is not a subscriber network;
  perform a hashing operation on the source address if the packet was received from the subscriber network and perform the hashing operation on the destination address if the packet was received from the different network, the hashing operation producing a hash value;
  determine if the packet is to be directed to a particular one of the plurality of traffic processors based on the hash value; and
  distribute the packet to the particular one of the plurality of traffic processors.

14. The logic of claim 13, further operable to:
distribute the packet to a control processor if the packet is not associated with the subscriber terminal or if the destination address is associated with the network element.

15. The logic of claim 13, wherein the packet comprises a request from the subscriber terminal to an information provider, the packet having a source address associated with the subscriber terminal.

16. The logic of claim 13, wherein the packet comprises a response from an information provider to a subscriber terminal, the packet having a destination address associated with the subscriber terminal.

17. The logic of claim 13, wherein the logic operable to determine whether the packet was received from a subscriber network or a different network that is not a subscriber network is further operable to determine whether the packet was received from a subscriber virtual local area network or a different network that is not a subscriber virtual local area network.

* * * * *